(No Model.)  3 Sheets—Sheet 1.
G. D. BURTON & J. M. HOLDEN.
STOCK CAR.
No. 274,458. Patented Mar. 27, 1883.
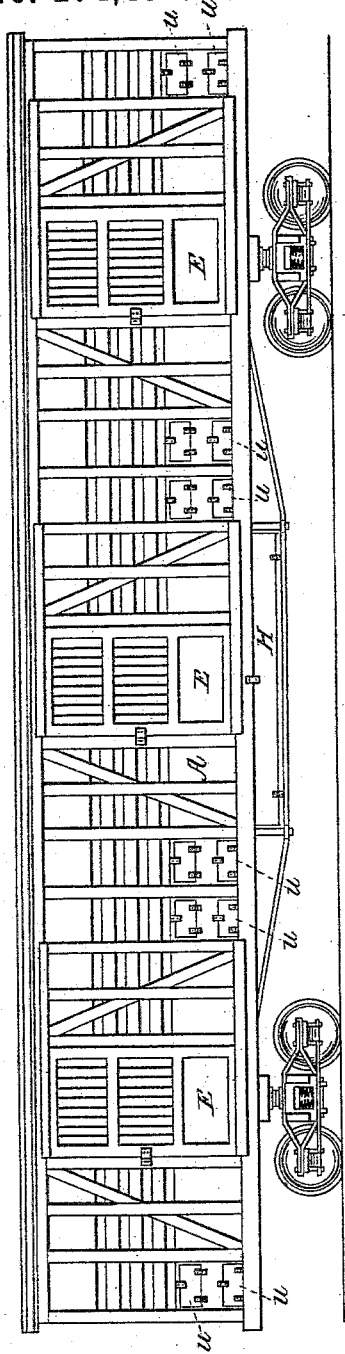
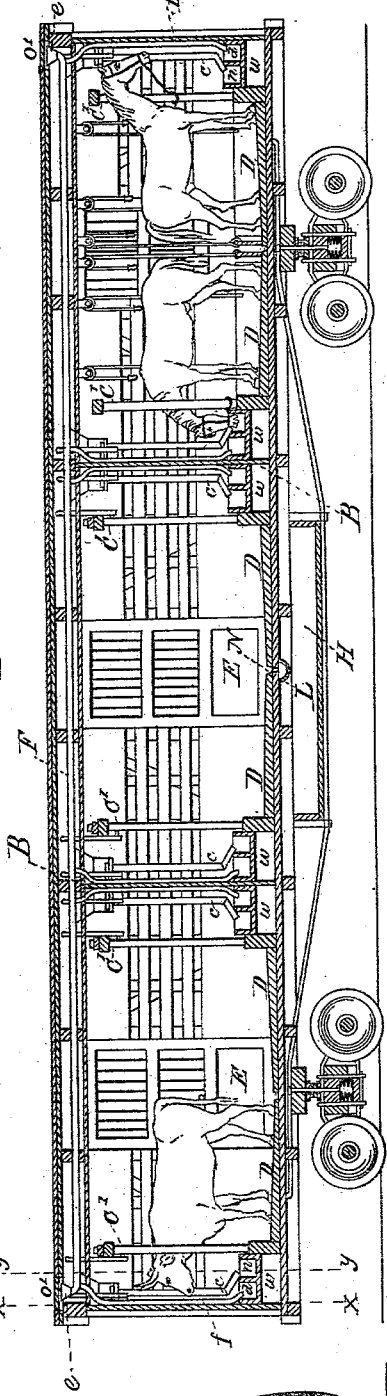
Fig. 1.
Fig. 2.
WITNESSES
INVENTORS
Geo. D. Burton
Joel M. Holden (No Model.) 3 Sheets—Sheet 2.

G. D. BURTON & J. M. HOLDEN.
STOCK CAR.

No. 274,458. Patented Mar. 27, 1883.

WITNESSES INVENTORS (No Model.) 3 Sheets—Sheet 3.

G. D. BURTON & J. M. HOLDEN.
STOCK CAR.

No. 274,458. Patented Mar. 27, 1883.

WITNESSES

INVENTORS

UNITED STATES PATENT OFFICE.

GEORGE D. BURTON AND JOEL M. HOLDEN, OF BOSTON, MASSACHUSETTS.

STOCK-CAR.

SPECIFICATION forming part of Letters Patent No. 274,458, dated March 27, 1883.

Application filed November 6, 1882. (No model.)

*To all whom it may concern:*

Be it known that we, GEO. D. BURTON and JOEL M. HOLDEN, citizens of the United States, residing at Boston, in the county of Suffolk and Commonwealth of Massachusetts, have invented certain new and useful Improvements in Stock-Cars, which have not been patented to ourselves or to others with our consent or knowledge in any foreign country; and we do hereby declare that the following is a full, clear, and exact description of the invention, which will enable others to make and use the same.

Our invention relates to improvements in cars for carrying stock, either cattle or horses, preventing the unloading to feed and water, and reloading, saving time and expense, and relieving the animals from cruel treatment in carrying them long distances without food and water, and in unnecessarily unloading them and reloading. Letters Patent have already been granted us—namely, to Geo. D. Burton, date January 3, 1882, No. 251,695, and to Joel M. Holden, application allowed September 16, 1882, Serial No. 67,004, for similar purposes. Our said previous inventions for stock-cars have been for carrying cattle. By our present improvements we can carry cattle or horses in the same car, and feed or water them without removing them, as stated in our said previous inventions; and each kind (cattle or horses) can lie down separately, have sufficient space, are properly fed and watered in the cars, and are carried at less expense, and without loss of time.

Figure 3:
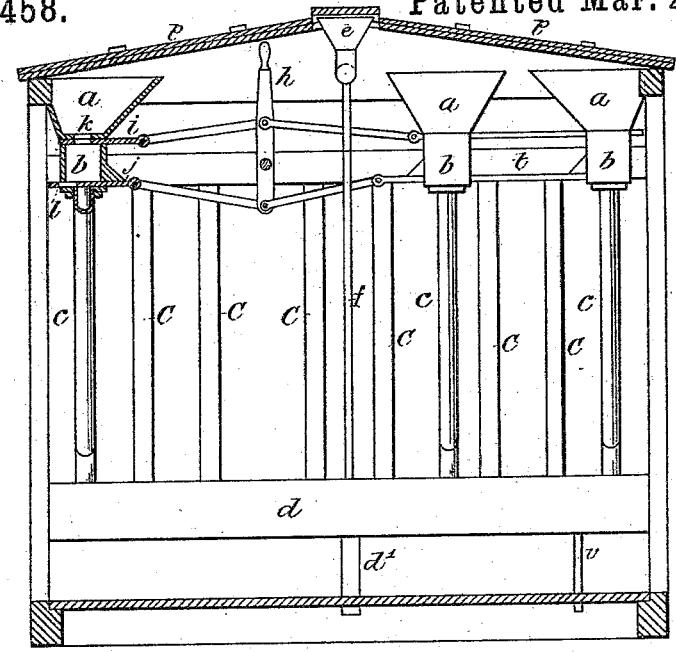
Figures 4, 7, 8:
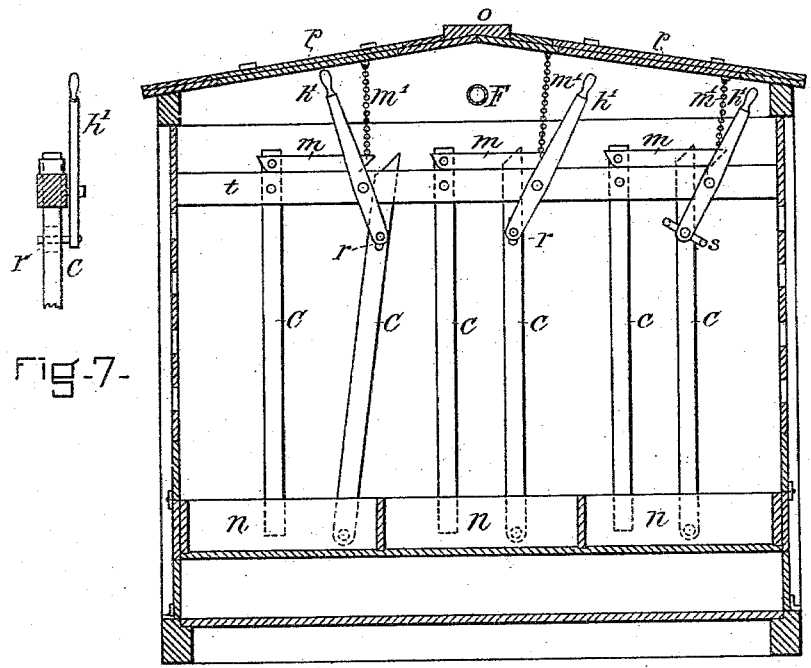
Figure 5:
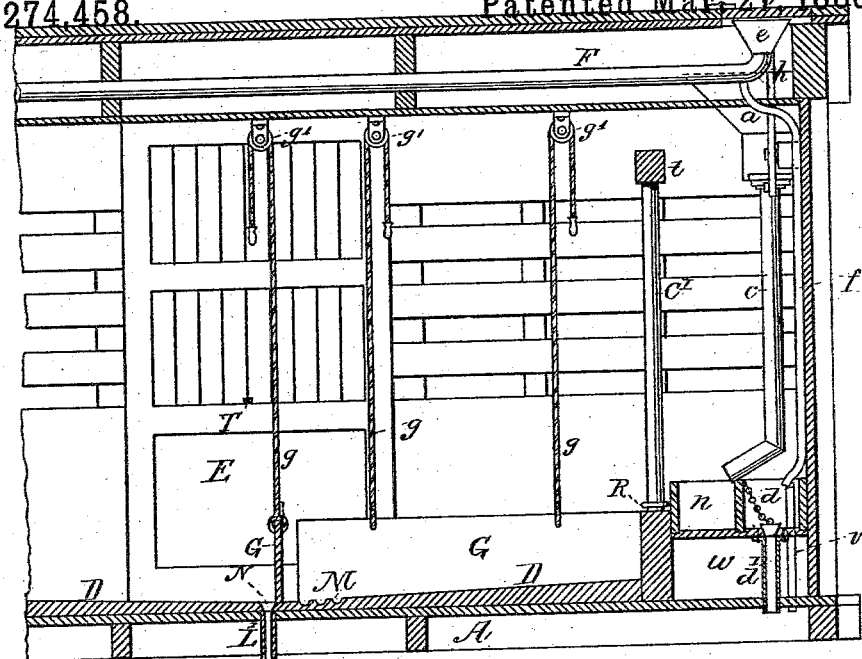
Figure 6:
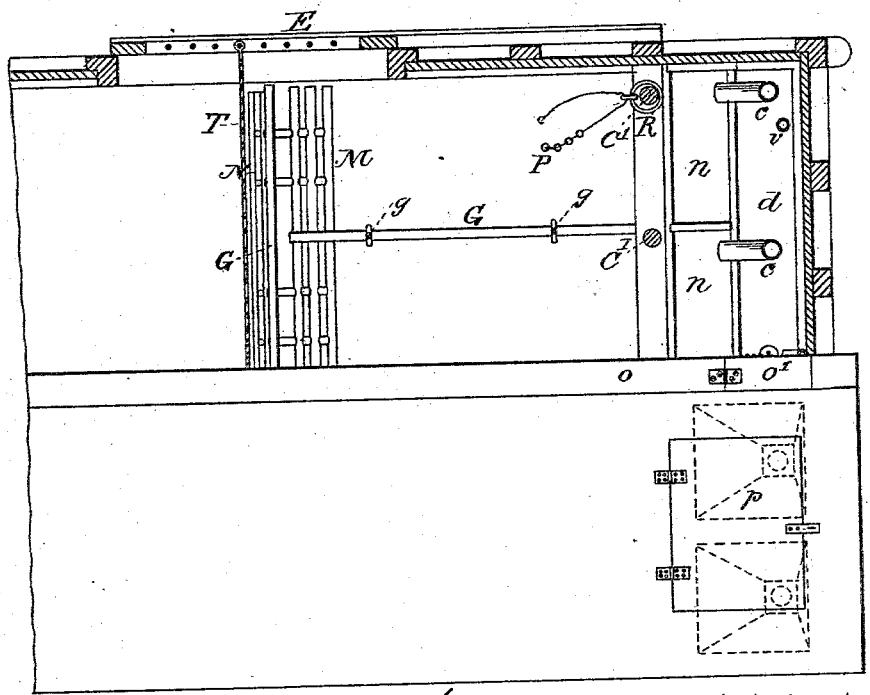

In the accompanying drawings, Figure 1 is a side elevation of our improved stock-car. Fig. 2 is a longitudinal vertical section of the same. Fig. 3 is a cross-section of the same on line $x\,x$ of Fig. 2. Fig. 4 is a cross-section of the same on line $y\,y$ of Fig. 2. Fig. 5 is an enlarged vertical section of one end of our stock-car. Fig. 6 shows part of our car in plan and part in horizontal section. Figs. 7 and 8 show the details of our method of opening and closing the stanchions from the top of the car.

A represents the car-body; B, the partitions dividing the car into compartments. C are the stanchion-bars. C' are the upright single bars, with rings R moving up and down on said bars, to which chains P, or ropes or halters, may be fastened. This will allow the cattle or horses attached to said bars to lie down or rise up at pleasure, and independently of each other. Said upright bars and rings and chains may be used as a substitute for the stanchions claimed in the said Burton patent. By these arrangements either cattle or horses can be carried together or separately, as desired. When horses are carried they will be furnished with the ordinary halter fastened to the said rings, moving up and down on the bars, as described. If cattle are carried, chains P will be used, moving with said rings, as shown in Fig. 6, said chains going around the neck of each animal and attached to said rings R, moving up and down on said upright bars. The chains P have hooks and smaller rings for different sizes of the necks of cattle.

D represents the inclined raised floors on the bottom of the car, extending to the central doorways, E, tending to preserve cleanliness in the car.

F is the ridge-beam pipe, into which water is received from the roadside water-crane, and is conducted by it to the distributing-pipes $f$, leading to the drinking-troughs $d$. The water and distributing pipes may be made of metal, wood, or rubber.

G are movable partitions, which may be made of wood or any flexible material, and are capable of being raised or lowered by ropes $g$ and pulleys $g'$. These partitions are placed between each two animals, separating them from each other, preventing them from crowding. Similar partitions extend transversely across the car, (raised or lowered, as before stated,) behind each animal, which, in case of horses, operate to prevent kicking. When it is desired to use the car as an ordinary freight-car these partitions may be drawn up by the ropes and pulleys, as described, to the top of the car and fastened there.

L is a trough placed under the center doorway, E, of the car, and over the food-box H a pipe, L', from the outer edge of the trough, carries off the urine or excrement. This trough L and pipe L' operate to prevent the urine or excrement from getting into the feed-deposit box H.

M are small grooves in the raised inclined floor D. These grooves, being under the hind feet of the cattle, enable them to stand firm without slipping, and also aid in carrying off urine or excrement. These grooves have smaller ones leading to the main outlet-grooves N, serving the same purpose.

T is a rope passing transversely across the car, behind the animals of each section, which operates to sustain them in place and prevents their being disturbed by the starting or stopping of the car. Canvas or other suitable material may be used instead of rope.

$a\ a\ a$ are tunnel-mouth bins, holding a bushel of grain, (more or less,) said bins being made of suitable wood or metal. $b\ b\ b$ are receptacles under said bins, of requisite size to hold food enough for one meal for each animal. The bottoms of said bins and receptacles are opened and closed by levers $h$ with connecting-rods and sliding plates $i\ j$, so that one movement of the levers opens the bottom of the receptacles and closes the outlet of the bins, and vice versa. Thus one movement of the levers supplies the requisite amount of food for each animal in that line for one meal. Pipes $c$, of requisite dimension, lead from each food-receptacle into a feed-trough in front of each animal. Doors $p\ p$ on the top of the car enable the bins to be filled as desired. There are separate troughs $n\ d$ used as feed and water troughs.

The water-crane at the roadside may be swung over the cars and inserted into the tunnel-mouth $e$, Fig. 6, of pipe F, supplying water. Smaller distributing-pipes, $f$, carry a supply of water to the water-trough $d$ in front of each animal.

The walking-plank $o$ on the top of the car, being hinged, forms a door, $o'$, Fig. 2, for the top of the water-tunnel, which is flush with the top of the car, operating to keep out dust and cinders from the water.

$p\ p$ are doors in the top of the car, through which the levers $h$ are operated by the brakemen or attendants.

In the tunnel-mouth bins and food-receptacles $k\ l$ are apertures in the sliding plates and feed-boxes, through which the grain or food passes when they are opened by the movement of the levers $h$.

In our present invention the troughs $d\ n$ are placed higher in the car for the convenience of horses, and this affords extra space underneath $w$ for the storage of any useful materials.

$u\ u$ are doors in the side of the car, the upper one for convenience in supplying fodder, the lower one for access to the extra space $w$.

$v$ is the overflow-pipe.

$d$ is the pipe in the bottom of the drinking-trough, having a plug and chain, allowing the water to run off after being used by the cattle.

$h'$ are levers pivoted on the cross-beam $t$, Fig. 4, operating to open and close the stanchions C. One end of said levers moves in a slot, $r$, in one of the stanchions, so that a movement of the levers to the right or left closes or opens the stanchions, fastening the animals in place or releasing them.

$m'$ are chains attached at one end to the key-bar $m$, which operates to lock the stanchions when closed. The other end of the chains $m'$ is attached to the roof of the car near the doors $p\ p$, so that the attendants may lift the key-bar $m$, and by a movement of the levers $h'$ release the animals, by opening the stanchions, without going inside of the car; or, instead of the slot $r$, in which the lever $h'$ works, a clamp, $s$, which partially surrounds one of said stanchions C at the end of said lever $h'$, as shown in Fig. 8, may be used. This device, by movement of the lever $h'$, operates to keep the stanchions in place when closed, or to open the stanchions by a movement of the lever $h$, to the left or to the right, as required.

Having described our invention, what we claim as new therein, and desire to secure by Letters Patent, is—

1. A stock-car having a trough, L, placed under the center doorway, E, of the car, with a pipe, L', leading from the outer edge of the trough, substantially as described, as and for the purpose set forth.

2. A stock-car having raised inclined floors with grooves M, substantially as described, as and for the purpose set forth.

3. A stock-car having stanchions C C, with levers $h'$, pivoted on the cross-beam $t$, one end of said levers moving in a slot, $r$, in one of the stanchions, in combination with the chains $m'$, attached to the key-bar $m$ of said stanchions and the roof of the car, and the doors $p\ p$, substantially as described, as and for the purpose set forth.

4. A stock-car having stanchions C and levers $h'$, pivoted to the cross-beam $t$ of said stanchions, one end of said levers having the clamping device $s$ partially surrounding one of said stanchions, in combination with the chains $m'$, attached to the key-bar $m$ and the roof of the car, and the doors $p\ p$ in said car, substantially as described, as and for the purpose set forth.

GEO. D. BURTON.
JOEL M. HOLDEN.

Witnesses:
G. M. GWIN,
GEO. E. BETTON.